United States Patent
Chang et al.

(10) Patent No.: US 8,213,086 B2
(45) Date of Patent: Jul. 3, 2012

(54) COATING COMPOSITION FOR ANTIREFLECTION WITH RESISTANCE AND ANTIREFLECTION CHARACTERISTIC AND ANTIREFLECTION FILM PREPARED BY USING THE SAME

(75) Inventors: Yeong-Rae Chang, Daejeon Metropolitan (KR); Young-Jun Hong, Daejeon Metropolitan (KR); Young-Eun Lee, Daejeon Metropolitan (KR); Tae-Su Kim, Daejeon Metropolitan (KR); Hyun-Woo Shin, Gwacheon-si (KR); Bu-Gon Shin, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 16 days.

(21) Appl. No.: 12/448,589

(22) PCT Filed: Dec. 28, 2007

(86) PCT No.: PCT/KR2007/006917
§ 371 (c)(1),
(2), (4) Date: Jun. 26, 2009

(87) PCT Pub. No.: WO2008/082168
PCT Pub. Date: Jul. 10, 2008

(65) Prior Publication Data
US 2009/0296219 A1 Dec. 3, 2009

(30) Foreign Application Priority Data

Dec. 29, 2006 (KR) ........................ 10-2006-0137601

(51) Int. Cl.
*G02B 1/10* (2006.01)
(52) U.S. Cl. .................... 359/586; 359/601; 359/614
(58) Field of Classification Search ........................ None
See application file for complete search history.

(56) References Cited

U.S. PATENT DOCUMENTS

| 5,234,748 | A | * | 8/1993 | Demiryont et al. | 428/216 |
| 6,846,568 | B2 | * | 1/2005 | Yamaya et al. | 428/447 |
| 6,897,478 | B2 | | 5/2005 | Koo et al. | |
| 2004/0209068 | A1 | | 10/2004 | Lin et al. | |
| 2005/0038137 | A1 | | 2/2005 | Yoshihara et al. | |
| 2005/0046957 | A1 | * | 3/2005 | Lai et al. | 359/652 |
| 2007/0172646 | A1 | | 7/2007 | Tanabe et al. | |

FOREIGN PATENT DOCUMENTS

| CN | 1430455 A | 7/2003 |
| EP | 01701184 A | 9/2006 |
| JP | 02-234101 | 9/1990 |
| JP | 06-018704 | 1/1994 |
| JP | 07-168006 | 7/1994 |
| JP | 11-138712 | 5/1999 |
| JP | 2000-053921 A | 2/2000 |
| JP | 2003-301133 | 10/2003 |
| JP | 2004-012657 A | 1/2004 |
| JP | 2004-359930 A | 12/2004 |
| KR | 10-2005-0003398 A | 1/2005 |
| KR | 10-2005-0048343 A | 5/2005 |
| KR | 10-2005-0048343 A | 5/2005 |
| KR | 10-2006-0074925 A | 7/2006 |
| WO | WO 2004/027517 A2 | 4/2004 |
| WO | WO 2004/042434 A1 | 5/2004 |
| WO | WO 2005-121841 A1 | 12/2005 |

\* cited by examiner

*Primary Examiner* — Arnel C Lavarias
(74) *Attorney, Agent, or Firm* — McKenna Long & Aldridge LLP

(57) ABSTRACT

A coating composition for antireflection that includes a low refraction-thermosetting resin having a refractive index of 1.2 to 1.45, a high refraction-ultraviolet curable resin having a refractive index of 1.46 to 2, and an ultraviolet absorber; an antireflection film manufactured using the coating composition; and a method of manufacturing the antireflection film. The antireflection film has excellent abrasion resistance and antireflection characteristic. Further, since the antireflection film can be manufactured in one coating process, it is possible to reduce manufacturing cost.

13 Claims, No Drawings

US 8,213,086 B2

COATING COMPOSITION FOR ANTIREFLECTION WITH RESISTANCE AND ANTIREFLECTION CHARACTERISTIC AND ANTIREFLECTION FILM PREPARED BY USING THE SAME

This application is a 35 U.S.C. §371 National Stage entry of International Application No. PCT/KR2007/006917, filed on Dec. 28, 2007, and claims the benefit of Korean Patent Application No. 10-2006-0137601 filed on Dec. 29, 2006, both of which are incorporated herein by reference in its entirety.

TECHNICAL FIELD

The present invention relates to a coating composition for antireflection, an antireflection film manufactured using the coating composition for antireflection, and a method of manufacturing the antireflection film. More particularly, the present invention relates to a coating composition for antireflection that can allow a film to have antireflection characteristic and improve the hardness of the film, by forming a layer that has GRIN (gradient refractive index) structure using difference in curing degree, in one coating process; an antireflection film manufactured using the coating composition for antireflection; and a method of manufacturing the antireflection film. This application claims priority from Korean Patent Application No. 10-2006-0137601 filed on Dec. 29, 2006 in the Korean Intellectual Property Office, the disclosure of which is incorporated herein by reference in its entirety.

BACKGROUND ART

An object to perform a surface treatment on the surface of a display is to improve image contrast by improving the abrasion resistance of the display and decreasing the reflection of light emitted from an external light source. The decrease of the reflection of external light can be achieved by two methods. One method causes diffused reflection by using convexo-concave shape on the surface, and the other method causes destructive interference by using a multi-coating design.

Anti-glare coating using the convexo-concave shape on the surface has been generally used in the related art. However, there have been problems in that resolution deteriorates in a high-resolution display and the sharpness of an image deteriorates due to diffused reflection. In order to solve the above-mentioned problems, Japanese Patent Application Publication No. 11-138712 has disclosed a light-diffusion film where light is diffused in a film that is manufactured by using organic filler having a refractive index different from a binder. However, since having been problems in that luminance and contrast deteriorate, the light-diffusion film needs to be modified.

A method of causing the destructive interference of reflected light by a multi-coating design has been disclosed in Japanese Patent Application Publication Nos. 02-234101 and 06-18704. According to this method, it is possible to obtain antireflection characteristic without the distortion of an image. In this case, light reflected from layers should have phase difference in order to allow reflected light to destructively interfere, and a waveform of reflected light should have amplitude so that reflectance can be minimized reflectance during the destructive interference. For example, when an incidence angle with respect to a single antireflection coating layer provided on the substrate is 0°, the following expressions can be obtained.

$$n_o n_s = n_1^2$$

$$2n_1 d_1 = (m+\tfrac{1}{2})\lambda \ (m=0, 1, 2, 3 \ldots) \qquad \text{[Math FIG. 1]}$$

($n_o$: the refractive index of air, $n_s$: the refractive index of a substrate, $n_1$: the refractive index of a film, $d_1$: the thickness of the film, $\lambda$: the wavelength of incident light)

In general, if the refractive index of the antireflection coating layer is smaller than the refractive index of the substrate, antireflection is effective. However, in consideration of the abrasion resistance of the coating layer, it is preferable that the refractive index of the antireflection coating layer is 1.3 to 1.5 times of the refractive index of the substrate. In this case, the reflectance is smaller than 3%. However, when an antireflection coating layer is formed on a plastic film, it is not possible to satisfy the abrasion resistance of a display. For this reason, a hard coating layer of several microns needs to be provided below the antireflection coating layer. That is, the antireflection coating layer using the destructive interference includes a hard coating layer for reinforcing abrasion resistance, and one to four antireflection coating layers that are formed on the hard coating layer. Accordingly, the multi-coating method obtains antireflection characteristic without the distortion of an image. However, there is still a problem in that manufacturing cost is increased due to the multi-coating.

A method of allowing reflected light to destructively interfere by a single coating design has been proposed in recent years. The following method has been disclosed in Japanese Patent Application Publication No. 07-168006. According to the method, ultrafine particle dispersed liquid is applied on a substrate, and the spherical shapes of fine particles are exposed to the surface so that the difference in refractive index is gradually generated between air (interface) and the particle. As a result, it is possible to obtain antireflection characteristic. However, since the shape and size of the ultrafine particles should be uniform and these particles should be uniformly distributed on the substrate, it is difficult to achieve this method by general coating processes. Further, since the amount of a binder should be equal to or smaller than a predetermined amount in order to obtain a spherical shape on the surface of the film, there is a problem in that this method is very vulnerable to abrasion resistance. Further, since the coating thickness should be also smaller than the diameter of the fine particle, there is a problem in that it is very difficult to obtain abrasion resistance.

DISCLOSURE

Technical Problem

In order to solve the above-mentioned problems, an object of the present invention is to provide a coating composition for antireflection that forms an antireflection film having abrasion resistance and antireflection characteristic. Since the antireflection film is manufactured in one coating process, it is possible to reduce manufacturing cost. Further, another object of the present invention is to provide an antireflection film manufactured using the coating composition for antireflection, and a method of manufacturing the antireflection film.

Technical Solution

In order to achieve the above-mentioned object, the present invention provides a coating composition for antireflection that includes a low refraction-thermosetting resin having a refractive index of 1.2 to 1.45, a high refraction-ultraviolet curable resin having a refractive index of 1.46 to 2, and an ultraviolet absorber.

Further, the present invention provides a method of manufacturing an antireflection film. The method includes i) preparing a coating composition for antireflection that contains a low refraction-thermosetting resin having a refractive index of 1.2 to 1.45, a high refraction-ultraviolet curable resin having a refractive index of 1.46 to 2, and an ultraviolet absorber; ii) forming a coating layer by applying the coating composition on a substrate; iii) radiating ultraviolet light in order to cure the high refraction-ultraviolet curable resin so that the high refraction-ultraviolet curable resin has a concentration gradient in a thickness direction of the coating layer; and iv) curing the low refraction-thermosetting resin.

Furthermore, the present invention provides an antireflection film. The antireflection film includes a low refraction-thermosetting resin having a refractive index of 1.2 to 1.45, a high refraction-ultraviolet curable resin having a refractive index of 1.46 to 2, and an ultraviolet absorber. The antireflection film includes a single coating layer in which the high refraction-ultraviolet curable resin has a concentration gradient in the thickness direction of a coating layer.

In addition, the present invention provides a polarizing plate. The polarizing plate includes a) a polarizing film, and b) the antireflection film according to the prevent invention that is provided on at least one side of the polarizing film.

Further, the present invention provides a display including the antireflection film or the polarizing plate.

Advantageous Effects

According to the present invention, it is possible to provide an antireflection film including an antireflection layer, which is composed of a single coating layer, by using the above-mentioned coating composition for antireflection and the method of manufacturing the antireflection film. The antireflection film according to the present invention has excellent abrasion resistance and antireflection characteristic. Further, since the antireflection film can be manufactured in one coating process, it is possible to reduce manufacturing cost.

BEST MODE

The present invention will be described in detail below.

According to the present invention, a low refraction-thermosetting resin and a high refraction-ultraviolet curable resin, which have different reaction mechanisms, are mixed to each other to prepare a coating composition. The coating composition is coated on a substrate in order to form a coating layer. Then, ultraviolet light is radiated on the coating layer so that the high refraction-ultraviolet curable resin has a concentration gradient in the thickness direction of the coating layer. Substantially, the low refraction-thermosetting resin is cured.

The ultraviolet light is radiated on the side of the coating layer facing the substrate (hereinafter, referred to as a substrate side) during the first radiation of the ultraviolet light in order to allow the ultraviolet curable resin to have a concentration gradient in the thickness direction of the coating layer. In this case, the coating composition is designed to include an ultraviolet absorber so that the ultraviolet light is not transmitted to the side of the coating layer coming in contact with air (hereinafter, referred to as an air side). Accordingly, the curing reaction of the high refraction-ultraviolet curable resin occurs from the substrate side of the coating layer, and a large amount of unreacted high refraction-ultraviolet curable resin is distributed at the portion close to the air side. While predetermined time passes after the first radiation of the ultraviolet light, the unreacted high refraction-ultraviolet curable resin is diffused and moved toward the substrate side and the low refraction-thermosetting resin is diffused and moved toward the air side in the coating layer. Subsequently, when ultraviolet light is radiated on both surfaces of the coating layer, the reaction of the high refraction-ultraviolet curable resin is terminated so that the high refraction-ultraviolet curable resin has the concentration gradient having higher density at the substrate side. After that, when heat is applied for the low refraction-thermosetting resin, an antireflection film having the GRIN structure is completely formed.

According to the present invention, after a coating layer having a thickness of several microns is formed as a single coating layer in one coating process by using the coating composition having the above-mentioned ingredients and the method of manufacturing the antireflection film, energy, such as ultraviolet light and heat energy, is preferably applied to the coating layer three times. As a result, it is possible to simultaneously obtain excellent abrasion resistance and antireflection characteristic that are the characteristics of hard coating, to improve the yield of the produce, and to reduce manufacturing time and other process cost, due to one coating process.

The low refraction-thermosetting resin is a thermosetting resin that has a refractive index in the range of 1.2 to 1.45. For example, a silicon alkoxide reactant that may cause a sol-gel reaction, a urethane reactive group compound, a urea reactive group compound, an esterification reactant, and the like may be used as the low refraction-thermosetting resin. The low refraction-thermosetting resin may contain a fluorine group. The silicon alkoxide reactant is reactive oligomer that is manufactured by performing hydrolysis and a condensation reaction of a silicon alkoxide under the conditions of water and a catalyst through a sol-gel reaction. In this case, when being measured by GPC while polystyrene is used as a reference material, the average molecular weight of the reactive oligomer is preferably in the range of 1,000 to 200,000. A condensation reaction is performed at a temperature equal to or higher than normal temperature after coating, so that the silicon alkoxide reactant manufactured as described above forms a net having the cross-linking structure.

Perfluorosilanes, tetraalkoxysilanes, and trialkoxysilanes may be used as the silicon alkoxide.

An example of the perfluorosilanes may include tridecafluorooctyltriethoxysilane, heptadecafluorodecyltrimethoxysilane, heptadecafluorodecyltriethoxysilane, and heptadecafluorodecyltriisopropoxysilane.

An example of the tetraalkoxysilanes may include tetramethoxysilane, tetraethoxysilane, and tetraisopropoxysilane. Further, an example of trialkoxysilanes may include methyltrimethoxysilane, methyltrimethoxysilane, glycidoxypropyltrimethoxysilane, glycidoxypropyltriethoxysilane, methyltriethoxysilane, and ethyltriethoxysilane.

It is preferable that the content of perfluorosilane silicon alkoxide reactant be 10 to 50 parts by weight based on 100 parts by weight of the entire silicon alkoxide reactant in order to allow the low refraction-thermosetting resin to have a refractive index of 1.2 to 1.45 and scratch resistance. If the content of the perfluorosilane silicon alkoxide reactant is smaller than 10 parts by weight, it is difficult to obtain a low refractive index. If the content of the perfluorosilane silicon alkoxide reactant exceeds 50 parts by weight, it is difficult to ensure the stability and scratch resistance of the solution.

The silicon alkoxide reactant may be manufactured by, for example, using 0.1 to 10 parts by weight of an acid that is a reaction catalyst and 5 to 50 parts by weight of water for hydrolysis based on 100 parts by weight of the entire silicon alkoxide reactant, and performing a sol-gel reaction at a temperature between the normal temperature and 100° C. for 1 to 48 hours. An example of the acid used in this case may include a nitric acid, a hydrochloric acid, and an acetic acid. A solvent, such as alcohol, ketone, or cellosolve, may be used to adjust the reaction rate and ensure the stability of the solution.

The urethane reactive group compound may be manufactured by the reaction between alcohol and an isocyanate compound while a metal catalyst is used. For example, if a coating solution in which a metal catalyst, multifunctional alcohol, and multifunctional isocyanate including two or more functional groups are mixed is maintained at a temperature equal to or higher than normal temperature, it is possible to form the net structure including a urethane reactive group. In this case, a fluorine group may be introduced in the alcohol or the isocyanate in order to achieve low refractive characteristic.

An example of multifunctional alcohol, which contains fluorine and is used to manufacture the urethane reactive group compound, may include
1H,1H,4H,4H-perfluoro-1,4-butanediol,
1H,1H,5H,5H-perfluoro-1,5-pentanediol,
1H,1H,6H,6H-perfluoro-1,6-hexanediol, 1H,1H,8H,8H-perfluoro-1,8-octanediol,
1H,1H,9H,9H-perfluoro-1,9-nonanediol,
1H,1H,10H,10H-perfluoro-1,10-decanediol,
1H,1H,12H,12H-perfluoro-1,12-dodecanediol, fluorinated triethylene glycol, and fluorinated tetraethylene glycol.

Aliphatic isocyanate, cycloaliphatic isocyanate, aromatic isocyanate, or heterocyclic isocyanate may be preferably used as an isocyanate ingredient that is used to manufacture the urethane reactive group compound. Specifically, diisocyanate, such as hexamethylene diisocyanate, 1,3,3-trimethylhexamethylene diisocyanate, isophorone diisocyanate, toluene-2,6-diisocyanate, and 4,4'-dicyclohexane diisocyanate, or three or more functional isocyanate, for example, DN950 and DN980 (trade name) manufactured by DIC corporation may be preferably used as the isocyanate ingredient.

According to the present invention, a catalyst may be used to manufacture the urethane reactive group compound. A Lewis acid or a Lewis base may be used as the catalyst. A specific example of the catalyst may include tin octylate, dibutyltin diacetate, dibutyltin dilaurate, dibutyltin mercaptide, dibutyltin dimaleate, dimethyltin hydroxide, and triethylamine. The catalyst is not limited thereto.

The content of the isocyanate and the multifunctional alcohol, which are used to manufacture the urethane reactive group compound, is preferably set so that the mole ratio (NCO/OH) between a NCO group and an OH group, which are functional groups, is preferably in the range of 0.5 to 2, and more preferably in the range of 0.75 to 1.1. If the mole ratio between the functional groups is smaller than 0.5 or exceed 2, the unreacted functional groups are increased. As a result, there may be a problem in that the strength of the film is decreased.

The urea reactive group compound may be manufactured by the reaction between amine and isocyanates. The isocyanates, which may be used to manufacture the urethane reactive group compound, may be used to manufacture the urea reactive group compound. Two or more functional perfluoro amines may be used as the amines. A catalyst may be used in the present invention, if necessary. A Lewis acid or a Lewis base may be used as the catalyst. A specific example of the catalyst may include tin octylate, dibutyltin diacetate, dibutyltin dilaurate, dibutyltin mercaptide, dibutyltin dimaleate, dimethyltin hydroxide, and triethylamine. The catalyst is not limited thereto.

The esterification reactant may be obtained by the dehydration and condensation reaction between an acid and alcohol. If the esterification reactant is also mixed in the coating solution, it is possible to form a film having the cross-linking structure. It is preferable that two or more functional acids including fluorine be used as the acid. A specific example of the two or more functional acids including fluorine may include a perfluorosucinic acid, a perfluoroglutaric acid, a perfluoroadipic acid, a perfluorosuberic acid, a perfluoroazelaic acid, a perfluorosebacic acid, and a perfluorolauric acid. It is preferable that multifunctional alcohol be used as the alcohol. A specific example of the alcohol may include 1,4-butanediol, 1,2-butanediol, 1,5-pentanediol, 2,4-pentanediol, 1,4-cyclohexanediol, 1,6-hexanediol, 2,5-hexanediol, 2,4-heptanediol, pentaerythritol, and trimethylolpropane. An acid catalyst such as a sulphuric acid or alkoxytitan such as tetrabutoxytitan may be used in the esterification reaction. However, the material used in the esterification reaction is not limited to the above-mentioned material.

The high refraction-ultraviolet curable resin having a refractive index of 1.46 to 2 is generally used together with a photoinitiator. An example of the ultraviolet curable resin may include acrylate monomer, urethane acrylate oligomer, epoxy acrylate oligomer, and ester acrylate oligomer. The ultraviolet curable resin may contain a substituent, such as sulfur, chlorine, or metal, or an aromatic material in order to obtain a high refractive index. Examples of the the ultraviolet curable resin having the substituent may include dipentaerythritol hexaacrylate, pentaerythritol tri/tetra acrylate, trimethylene propane triacrylate, ethylene glycol diacrylate, 9,9-bis(4-(2-acryloxy ethoxy phenyl)fluorine (refractive index: 1.62), bis(4-methacryloxythiophenyl)sulphide (refractive index: 1.689), and bis(4-vinylthiophenyl)sulphide (refractive index: 1.695). The mixture of one or two or more thereof may be used.

1 to 20 parts by weight of the photoinitiator may be used based on 100 parts by weight of the ultraviolet curable resin. An example of the photoinitiator may include 1-hydroxy cyclohexyl phenyl ketone, benzyl dimethyl ketal, hydroxy dimethyl acetophenone, benzoin, benzoin methyl ether, benzoin ethyl ether, benzoin isopropyl ether, and benzoin butyl ether.

According to the present invention, an ultraviolet absorber is added so that the ultraviolet light is not transmitted to the air side of the coating layer. Benzophenones, benzotriazoles, salicylates, cyanoacrylates, or oxanilidess may be used as the ultraviolet absorber. A light stabilizer may be further used. The content of the ultraviolet absorber may be in the range of 0.05 to 30 parts by weight based on 100 parts by weight of the entire resin, and more preferably in the range of 1 to 20 parts by weight. If the content of the ultraviolet absorber is smaller than 0.05 parts by weight, ionizing radiation is transmitted to the air side of the coating layer during the first radiation of the ultraviolet light. For this reason, it is not possible to obtain an effect of GRIN. If the content of the ultraviolet absorber exceeds 30 parts by weight, a coated film is not sufficiently cured. For this reason, there may be a problem in that the strength of the film is decreased.

It is preferable that the difference between refractive indices of the curable resins, which have different reaction mechanisms as described above, be 0.01 or more after the drying and curing. In this case, it is possible to efficiently from the GRIN structure and obtain an antireflection effect.

As for the content of each resin in the coating composition, it is preferable that the content of the low refraction-thermosetting resin be 5 to 80 parts by weight, the content of the high refraction-ultraviolet curable resin be 10 to 90 parts by weight, and the content of the ultraviolet absorber be 0.05 to 30 parts by weight, based on 100 parts by weight of the entire solid composition.

In addition, a solvent may be used for coatability, and the content of the solvent may vary depending on the coating method. An alcohol solvent, an acetate solvent, a ketone solvent, a cellosolve solvent, an imide solvent, or an aromatic solvent may be used as the solvent. Further, a fluorine wetting agent, a silicon wetting agent, or an acryl wetting agent may be added to improve the wettability of the coating solution, and the same kinds of lubricating agent may be added to improve surface smoothness.

In addition, the present invention provides a method of manufacturing an antireflection film using the above-mentioned coating composition for antireflection. Specifically, the method according to the present invention includes i) preparing a coating composition for antireflection that contains a low refraction-thermosetting resin having a refractive index of 1.2 to 1.45, a high refraction-ultraviolet curable resin having a refractive index of 1.46 to 2, and an ultraviolet absorber; ii) forming a coating layer by applying the coating composition on a substrate; iii) radiating ultraviolet light in order to cure the high refraction-ultraviolet curable resin so that the high refraction-ultraviolet curable resin has a concentration gradient in a thickness direction of the coating layer; and iv) curing the low refraction-thermosetting resin.

In Step ii), the substrate is not particularly limited. However, a plastic film may be used as the substrate, and the thickness of the plastic film is not limited. An example of the plastic film includes a triacetate cellulose film, a norbornene cycloolefin polymer, a polyester film, a polymethaacrylate film, and a polycarbonate film.

Bar coating, two-roll or three-roll reverse coating, gravure coating, die coating, micro gravure coating, or comma coating may be generally performed as the coating in Step ii). The coating thickness is preferably in the range of 1 to 30 μm, and it is preferable that a drying process for drying a solvent be performed after the coating.

In Step iii), the ultraviolet light curing may be performed as follows: first, when ultraviolet light is radiated on the backside of the substrate, the curing is performed from the substrate side of the coating layer. In this case, a high refraction-ultraviolet curable resin layer is formed. The most amount of an unreacted ultraviolet curable resin remains on the surface of the air side of the coating layer, and the amount of the unreacted ultraviolet curable resin is decreased toward the inside of the coating layer. It is preferable that the dosage of the ultraviolet light used in this case be in the range of 50 to 2,000 mJ/cm$^2$. Since the ultraviolet light radiated on the substrate side of the coating layer is absorbed by the ultraviolet absorber in the coating layer, the ultraviolet light cannot transmitted to the surface of the air side of the coating layer. It is preferable that setting be performed at a temperature of 20 to 150° C. for 10 seconds to 20 minutes after the radiation of the ultraviolet light. If a setting time is shorter than 10 seconds, the unreacted resin is not sufficiently diffused. For this reason, the difference of the refractive index in the coating layer is decreased, so that the antireflection characteristic deteriorates. If the setting time is 20 minutes or more, characteristics are not changed but there is a problem in that manufacturing time is increased. Subsequently, ultraviolet light is radiated on both sides of the coating layer, so that it is possible to completely cure the ultraviolet curable resin. Even when ultraviolet light is radiated on both sides of the coating layer, it is possible to use the conditions exemplified when ultraviolet light is radiated on the substrate side.

After ultraviolet light is completely radiated, thermal curing is performed to cure the low refraction-thermosetting resin. It is preferable that the thermal curing be performed at a temperature of 25 to 200° C. for 10 seconds to 24 hours.

The antireflection film according to the present invention, which is manufactured by using the above-mentioned coating composition for antireflection and the method of manufacturing the antireflection film, includes the low refraction-thermosetting resin having a refractive index of 1.2 to 1.45, the high refraction-ultraviolet curable resin having a refractive index of 1.46 to 2, and the ultraviolet absorber. In this case, the antireflection film includes a single coating layer in which the high refraction-ultraviolet curable resin has a concentration gradient in the thickness direction of the coating layer.

In the antireflection film, the weight of the high refraction-ultraviolet curable resin, which is included in a region corresponding to 50% of the thickness in the thickness direction from the surface of the single coating layer facing the substrate, is preferably 70% or more of the total weight of the high refraction-ultraviolet curable resin, and more preferably 95% or more of the total weight thereof. The reflectance of the antireflection film according to the present invention is lower 3%, which is excellent.

The present invention provides a polarizing plate that includes the above-mentioned antireflection film according to the present invention. Specifically, the polarizing plate according to the present invention includes a) a polarizing film, and b) the antireflection film according to the present invention that is provided on at least one side of the polarizing film. A protection film may be provided between the polarizing film and the antireflection film. Further, the substrate, which is used to form the single coating layer during the manufacture of the antireflection film, may be used as the protection film, as it is. The present invention provides a display that includes the antireflection film or the polarizing plate. The display may be a liquid crystal display or a plasma display. The display according to the present invention may have the structure known in the art, except for the fact that the antireflection film according to the present invention is provided. For example, in the display according to the present invention, the antireflection film may be provided on the outermost surface of a display panel facing an observer or on the outermost surface thereof facing a backlight. Further, the display according to the present invention may include a display panel, a polarizing film that is provided on at least one side of the panel, and an antireflection film that is provided on the side opposite to the side of the polarizing film facing the panel.

MODE FOR INVENTION

Preferred examples will be provided below for the understanding of the present invention. However, the following examples merely exemplify the present invention, and the sprit and scope of the present invention are not limited to the following examples.

EXAMPLES

Example 1

Preparation of Low Refractive Material Forming Urethane Compound 15.3% by weight of DN 980 (manufactured by DIC corporation) in which the average number of isocyanate functional groups is three, 14% by weight of two functional alcohol 1H,1H,12H,12H-perfluoro-1,12-dodecanediol including fluorine, 0.7% by weight of dibutyltin dilaurate as a metal catalyst, and 35% by weight of each of diacetone alcohol (DAA) and methyl ethyl ketone (MEK) as a solvent were uniformly mixed to prepare a low refractive solution. In this case, the refractive index of a low refractive material was 1.42 after coating and curing.

Preparation of High Refraction-Ultraviolet Curable Material

28% by weight of dipentaerythritol hexaacrylate (DPHA) as multifunctional acrylate for improving the strength of a coating film, 2% by weight of Darocur 1173 as an ultraviolet light initiator, and 35% by weight of each of diacetone alcohol (DAA) and methyl ethyl ketone (MEK) as a solvent like the composition of the low refractive solution were uniformly mixed to prepare a high refractive solution. In this case, the refractive index of a high refractive material was 1.53 after coating and curing.

Example 2

Preparation of Low Refractive Material Forming Esterification Compound

23% by weight of an perfluorosuberic acid that is a two functional acid including fluorine, 6.5% by weight of three functional alcohol trimethylolpropane, 0.5% by weight of tetrabutoxytitan that is a catalyst, 30% by weight of isopropanol (IPA) as a solvent, and 40% by weight of dimethylformamide (DMF) were uniformly mixed to prepare a low refractive solution. In this case, the refractive index of a low refractive material was 1.39.

Preparation of High Refraction-Ultraviolet Curable Material

8% by weight of bis(4-methacryloxythiophenyl)sulphide, 20% by weight of dipentaerythritol hexaacrylate (DPHA), 2% by weight of Darocur 1173 as an UV initiator, 35% by weight of each of diacetone alcohol (DAA), methyl ethyl ketone (MEK) as a solvent like the composition of the low refractive solution were uniformly mixed to prepare a high refractive solution. In this case, the refractive index of a high refractive material was 1.55.

A coating solution was manufactured by the following method with the low refractive material and the high refractive material that are manufactured in Examples 1 and 2.

Manufacture of Coating Solution

20% by weight of the low refractive solution (6 weight of the content of solid), 77% by weight of the high refractive solution (23.1 weight of solid), and 3% by weight of Cyasorb UV-24 (manufactured by Cytec Industries Inc.) as an ultraviolet absorber were uniformly mixed to prepare a compatible compound liquid.

Comparative Example 1

The only high refractive coating solution prepared in the Example 1 was used.

Comparative Example 2

The only low refractive coating solution prepared in the Example 1 was used.

Comparative Example 3

A coating solution was prepared in the same manner as in the Example 1, except that the ultraviolet absorber was not used.

The coating solutions manufactured in the above-mentioned examples and comparative examples were coated on a 60 μm norbornene cycloolefin polymer film by a meyer bar #12, and then dried by an oven at a temperature of 60° C. for 1 minute. Substantially, ultraviolet light was radiated on the substrate side of the coating layer at a dosage of 200 mJ/cm$^2$ by a medium pressure mercury lamp. Then, after being maintained for 1 minute, ultraviolet light was radiated on the substrate side and the air side, and cured by the oven at a temperature of 90° C. for 30 minutes. The thickness of the film obtained in this case was 5 μm.

The abrasion resistance and the optical characteristic of the antireflection film manufactured as described above were evaluated as follows:

1) Evaluation of Scratch Resistance

After steel wool (#0000) was reciprocated ten times under the load of 1 kg, the degree of scratch occurrence was evaluated.

2) Reflectance

After blackening was performed on the backside of the coating film, reflectance was measured by a Solid Spec. 3700 spectrophotometer that was manufactured by Shimadzu Corporation. The antireflection characteristic was evaluated using the minimum value of measured reflectance.

The evaluation results of the scratch resistance and the reflectance were shown in Table 1.

TABLE 1

|  | Example 1 | Example 2 | Compatative example 1 | Compatative example 2 | Compatative example 3 |
| --- | --- | --- | --- | --- | --- |
| Scratch resistance | Good | Good | Good | Scratch occurrence | Good |
| Reflectance (%) | 2.1 | 1.5 | 3.8 | 2.0 | 3.6 |

From the evaluation results, it was possible to understand that the film manufactured by the present invention had excellent scratch resistance and reflectance.

The invention claimed is:

1. A coating composition for an antireflection single coating layer comprising:
    a low refraction-thermosetting resin having a refractive index of 1.2 to 1.45;
    a high refraction-ultraviolet curable resin having a refractive index of 1.46 to 2; and
    an ultraviolet absorber,
    wherein the high refraction-ultraviolet curable resin has a continuous concentration gradient in a thickness direction of the single coating layer,
    wherein the single coating layer is manufactured by a curing process that involves radiating ultraviolet light and thermosetting,
    wherein the low refraction-thermosetting resin includes one or more compounds selected from the group consisting of a silicon alkoxide reactant that cause a sol-gel reaction, a urethane reactive group compound, a urea reactive group compound, and an esterification reactant, and
    wherein the high refraction-ultraviolet curable resin includes one or more monomers selected from the group consisting of acrylate monomer, urethane acrylate oligomer, epoxy acrylate oligomer, and ester acrylate oligomer.

2. The coating composition for an antireflection single coating layer according to claim 1 further comprising 1 to 20 parts by weight of a photoinitiator based on 100 parts by weight of the high refraction-ultraviolet curable resin.

3. The coating composition for an antireflection single coating layer according to claim 1, wherein the content of the low refraction-thermosetting resin is 5 to 80 parts by weight, the content of the high refraction-ultraviolet curable resin is 10 to 90 parts by weight, and the content of the ultraviolet absorber is 0.05 to 30 parts by weight, based on 100 parts by weight of the entire solid composition.

4. The coating composition for an antireflection single coating layer according to claim 1 further comprising a solvent.

5. An antireflection film comprising:
    a single coating layer, the single coating layer including a low refraction-thermosetting resin having a refractive index of 1.2 to 1.45; a high refraction-ultraviolet curable resin having a refractive index of 1.46 to 2; and an ultraviolet absorber,
    wherein the high refraction-ultraviolet curable resin has a continuous concentration gradient in a thickness direction of the single coating layer,
    wherein the single coating layer is manufactured by a curing process that involves radiating ultraviolet light and thermosetting,
    wherein the low refraction-thermosetting resin includes one or more compounds selected from the group consisting of a silicon alkoxide reactant that cause a sol-gel reaction, a urethane reactive group compound, a urea reactive group compound, and an esterification reactant, and
    wherein the high refraction-ultraviolet curable resin includes one or more monomers selected from the group consisting of acrylate monomer, urethane acrylate oligomer, epoxy acrylate oligomer, and ester acrylate oligomer.

6. The antireflection film according to claim 5, wherein the weight of the high refraction-ultraviolet curable resin, which is included in a region corresponding to 50% of the thickness in the thickness direction from the surface of the single coating layer facing the substrate, is 70% or more of the total weight of the high refraction-ultraviolet curable resin.

7. The antireflection film according to claim 5, wherein reflectance is lower than 3%.

8. The antireflection film according to claim 5, wherein the antireflection film is formed by a method of manufacturing an antireflection film including: i) preparing a coating composition for antireflection that contains a low refraction-thermosetting resin having a refractive index of 1.2 to 1.45, a high refraction-ultraviolet curable resin having a refractive index of 1.46 to 2, and an ultraviolet absorber; ii) forming a coating layer by applying the coating composition on a substrate; iii) radiating ultraviolet light in order to cure the high refraction-ultraviolet curable resin so that the high refraction-ultraviolet curable resin has a concentration gradient in a thickness direction of the coating layer; and iv) curing the low refraction-thermosetting resin.

9. The antireflection film according to claim 8, wherein Step iii) includes iiia) radiating ultraviolet light on the side of the coating layer facing the substrate, iiib) diffusing and moving an unreacted high refraction-ultraviolet curable resin toward the side of the coating layer facing the substrate and the low refraction-thermosetting resin toward the side of the coating layer coming in contact with air, and iiic) radiating ultraviolet light on both sides of the coating layer.

10. A polarizing plate comprising:
    a) a polarizing film; and
    b) the antireflection film according to claim 5 that is provided on at least one side of the polarizing film.

11. The polarizing plate according to claim 10 further comprising a protection film that is provided between the polarizing film and the antireflection film.

12. The polarizing plate according to claim 10, wherein the antireflection film includes a substrate layered on a single coating layer, and the substrate is provided between the polarizing film and the single coating layer.

13. A display comprising the antireflection film according to claim 5.

* * * * *